(12) United States Patent
Colleran et al.

(10) Patent No.: US 7,624,352 B2
(45) Date of Patent: *Nov. 24, 2009

(54) RESPONSIVE USER INTERFACE TO MANAGE A NON-RESPONSIVE APPLICATION

(75) Inventors: John David Colleran, Redmond, WA (US); Gerardo Bermudez, Redmond, WA (US); Vadim Gorokhovky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 295 days.

This patent is subject to a terminal disclaimer.

(21) Appl. No.: 10/945,537

(22) Filed: Sep. 20, 2004

(65) Prior Publication Data

US 2005/0091611 A1    Apr. 28, 2005

Related U.S. Application Data

(63) Continuation of application No. 09/543,930, filed on Apr. 6, 2000, now Pat. No. 6,850,257.

(51) Int. Cl.
*G06F 3/048* (2006.01)

(52) U.S. Cl. .................. 715/764; 715/768; 715/781; 715/804

(58) Field of Classification Search .......... 715/781, 715/804, 764, 768

See application file for complete search history.

(56) References Cited

U.S. PATENT DOCUMENTS

| | | | |
|---|---|---|---|
| 4,712,191 A | 12/1987 | Penna | |
| 4,890,098 A | 12/1989 | Dawes et al. | |
| 5,363,483 A | 11/1994 | Jones et al. | |
| 5,499,334 A | 3/1996 | Staab | |
| 5,515,493 A * | 5/1996 | Boston et al. | 715/807 |
| 5,524,263 A | 6/1996 | Griffth et al. | |
| 5,668,997 A | 9/1997 | Lynch-Freshner et al. | |
| 5,805,892 A | 9/1998 | Nakajima | |
| 5,911,060 A | 6/1999 | Elliott | |
| 6,009,258 A * | 12/1999 | Elliott | 703/22 |
| 6,662,310 B2 * | 12/2003 | Lopez et al. | 714/15 |

OTHER PUBLICATIONS

Richter, Jeffrey, "Win32 Local-input-state Hooks in Windows," *Microsoft Systems Journal*, vol. 12, No. 3, pp. 85-87 (Mar. 1997).
Silberschatz, *Operating Systems Concepts*, Addison-Wesley, 4$^{th}$ Edition, pp. 111-114 (1994).

* cited by examiner

*Primary Examiner*—Dennis-Doon Chow
*Assistant Examiner*—Sajeda Muhebbullah
(74) *Attorney, Agent, or Firm*—Merchant & Gould P.C.

(57) ABSTRACT

A method and system are provided for managing application programs with non-responsive user interfaces, possibly due to a bottleneck in handling events/messages. The method and system make an apparently frozen application user interface responsive so as to permit alternative tasks be executed or close the hung application. This is enabled by implementing routines to (a) detect if an application is hung, (b) replace the user interface for the hung application with a ghost interface, implemented by a separate thread, that permits system functionality such as sizing, minimization and closing of the application, and (c) destroying the ghost interface if the hung application becomes responsive again along with restoring the application's user interface along with updated event queues. Furthermore, creation of the ghost user interface is accompanied by placing a high priority special event in the hung application's queue to detect renewed responsiveness without requiring explicit monitoring.

19 Claims, 10 Drawing Sheets

RESPONSIVE USER INTERFACE TO MANAGE A NON-RESPONSIVE APPLICATION

CROSS-REFERENCE TO RELATED PATENT APPLICATIONS

This patent application is a continuation of a co-pending U.S. patent application Ser. No. 09/543,930, attorney docket No. 202732, filed Apr. 6, 2000, entitled "RESPONSIVE USER INTERFACE TO MANAGE A NON-RESPONSIVE APPLICATION."

TECHNICAL FIELD

This invention relates generally to development of computer operating systems for executing software applications and more particularly to the development of user interface capabilities provided to application programs by an operating system.

BACKGROUND OF THE INVENTION

There is an increasing appreciation for the need for aesthetics and ease of use in the design of user interfaces ("UI") to encourage use of computer applications and reduce frustration. To term the new user interfaces design strategies in cutting edge software as being "ergonomic" is not an overstatement. Such interfaces are a combination of functionality coded in the application and supported by the underlying platform, which may be an operating system ("OS"). Thus, the OS provides significant support for realizing an effective UI, and such support is an important factor in the competition between different OS available in the market.

Application programs are typically written for execution on a particular platform. Such a platform may be defined by a virtual machine offering a relatively invariant context regardless of the underlying hardware or an OS that is tied down to a particular hardware platform or even an application providing an execution context for another application, e.g., a plug-in module. The platform includes a plurality of services and appropriate management strategies to allow different applications access to system resources. These services provide many of the functions that applications are expected to use and thus free the application writer from worrying about the more mundane implementation details such as security, reading and writing data, managing memory resources, and I/O functions. Not surprisingly, this is an effective strategy since the services provided by the OS are used repeatedly. Having a single coherent implementation reduces complexity and enhances design of stable computing systems capable of executing different applications.

OS for computers, and for personal computers in particular, have undergone many changes. These changes not only improve the range of services available to applications, typically through an Application Programming Interface (API), but also provide new architectures that reduce the likelihood of crashing the entire computer system due to errors including those ascribable to applications or users. An important advance in designing stable computing systems has been the development of multithreaded systems, which are described further below.

Traditional OSs for personal computers used a single threaded architecture in which programming code was executed in a serial fashion. Any step or sequence of steps could result in a fatal bottleneck. A user is often hard-pressed to distinguish delays from a system failure. An improvement was a computing environment where if a busy application, as opposed to a non-functional application, could indicate that it was busy to the user, or preferably relinquish control to the OS to allow other applications and tasks to execute before being granted control again. Such computing environments were at the mercy of a well-behaved and cooperative application.

In contrast, in a multithreaded architecture the OS exercises greater control over the execution of different tasks. The OS schedules slices of time on the processor for identified units termed threads. A thread is a path of execution within a process that is recognized and provided time on the processor by the OS. Each application usually has at least one thread and, thus, is assigned time in accordance with its relative priority. Additionally, often an application executes in its own address space, particularly if it is treated as a process by the OS. This results in isolation of different processes from each other and contributes to greater system stability and robustness even when executing faulty applications.

It should be understood that the term thread refers to code that is provided execution time slices by an external entity, e.g., the OS. This does not foreclose a developer of an application to define a path of execution within the application such that the application directly controls the time allocated to a particular path while the OS may be unaware of its existence. For clarity, such developer defined execution paths are referred to as "fibers" as opposed to threads. The benefit in using threads is that, even if an application is defective it cannot hold up rest of the computing system, since it never has exclusive control of the computing environment. However, this statement should not be interpreted to imply that rogue applications designed to subvert the OS are not possible in a multithreaded computing environment. Accordingly, for conceptual convenience, threads may be generalized to scheduled code paths.

At least one of the threads assigned to an application is termed its main thread and typically implements the UI for the application. Modern UIs are usually graphical interfaces formed by a plurality of elements termed window elements or just windows. These window elements, controlled by the threads in a system, are displayed to a user. The display space available on the desktop is referred to as "real estate." The desktop is typically implemented with the help of routines such as paint( ) to continually update it to reflect the current state and order of the windows displayed on it. A desktop thread, which is a system thread, manages painting of the desktop windows and also handles miscellaneous system events. Some windows that are fully or partially occluded by other windows may not be displayed in their entirety. The window in the foreground commands the attention of the user and has focus. Usually, the focus shifts as other windows are selected to be in the foreground.

Since window elements are not only output symbols but also aid in the input of events, each thread managing a window element is required to have a message loop. This loop allows messages to be sent for handling by the window element on the desktop.

Similarly, messaging allows processing of input events by the OS, the application program or even the user by presenting them in an orderly fashion.

In addition, user input to the computer system is received from the hardware devices via a thread termed the raw input thread (RIT). The OS sorts the input events such as keystrokes, mouse movements, mouse clicks and the like in the RIT queue and forwards them to the appropriate application input thread queues or OS routines for handling. Input events are usually posted to an application owning the window element in focus. Furthermore, not all events are handled with the same priority. Some events, e.g., key combinations such as Alt-Tab keys shift focus from one window to another and are handled out of turn. Since each application has its own input queue, the failure of an application to handle its own queue entries is not fatal. In other words, it does not "hang" the entire system by making it unresponsive to further inputs.

The OS also provides implementation code for a variety of graphical objects and windows for use by application programs. This not only saves creators of applications the complex task of writing graphical code, but also promotes standardization of the UI. An example of such an interface is the familiar window interface in the "WINDOWS®" OSs manufactured by the "MICROSOFT®" Corporation of Redmond, Wash. The interface includes an enclosing rectangle, system buttons for closing, maximizing or restoring the window element, and an enclosed area that is available to the application/user to display arbitrary graphical or text symbols. The enclosing rectangle edges and corners are also usable for resizing the rectangle with the use of a pointing device such as the familiar mouse. Other designs for UIs are also possible along with modifications to the familiar designs, e.g., by varying color schemes/designs, transparency and other properties.

As described previously, the desktop displays window elements in accordance with an ordering termed Z-ordering. Z-ordering identifies the window in the foreground and the various other windows on a tree structure. This tree structure is suitably manipulated when a different window is moved to the foreground, possibly due to a change in focus due to a user clicking on another window and consequently transferring focus. Such transfer of focus can also results in another application or thread getting the input events from the RIT.

It is possible for an application to hang, and at the very least give the user the impression of being non-responsive, if an application fails to process its input queue. For instance, ordinarily the main thread of an application manages its windows. Thus, if the main thread of the application is occupied by a task then the entire application may appear to hang, i.e. be non-responsive. The area on the desktop, i.e., the real estate, occupied by window elements controlled by its main thread appears to be frozen. A user may find it difficult to close or manage such an application and may, indeed, lose significant control over the apparently frozen system. Even a mere delay may result in a drastic action being taken by many a user such as rebooting the system leading to possible loss of data and even damage to the file structure and the hardware.

SUMMARY OF THE INVENTION

In view of the foregoing, the present invention provides a method and system for executing software application programs that provide a UI for replacing an apparently frozen application's UI. The replacement UI is responsive enough to permit moving, sizing, minimization, or closing of the hung window. Furthermore, the frozen or hung application may be closed by a user without risking rebooting the entire system resulting in possible data loss or damage to the hardware. This is enabled by implementing, preferably as part of the OS, routines to (a) detect if an application is hung, (b) replace the UL for the hung application with a ghost UI that permits limited functionality such as moving, sizing, minimization and closing of the application, and (c) destroying the ghost UI if the hung application becomes responsive. The destruction of the ghost window is followed by restoring the application's UI along with updated queue entries.

Hung applications are preferably detected by the duration for which they fail to handle entries queued on their respective input threads. In response to the detection of a hung application a ghost user interface is created. The ghost UI is preferably provided by a separate thread dedicated to managing ghost interfaces for hung applications. Creation of a ghost UI is accompanied by placing a high priority special entry in the queue for the application. This results in detection of the responsiveness of the application by its handling of the high priority special entry ahead of other queue entries. This, in turn, triggers the restoration of the application's UI and destruction of the associated ghost UI if the application becomes responsive again. To the user the effect is of watching a user interface change in some respects while retaining functionality related to managing the window and closing the frozen application using the familiar commands. Furthermore, the facility for caching input for the application makes the transformation smooth with few discontinuities since there are few "lost" commands while the ghost user interface is operative. The extent and nature of caching is implementation specific and affects the smoothness of the transition to a ghost user interface and back again to the application's interface.

As is apparent, the method is generally useful in employing at least one dedicated thread for providing replacement user interfaces for a plurality of threads or applications in response to an appropriate signal and restore the original user interface in response to another signal. Furthermore, the threads may be replaced by independently scheduled code segments that may be executing on different machines or processors without any loss of generality. Of course, the dedicated thread may perform other activities that do not detract from its primary task of providing a replacement interface.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may best be understood from the following detailed description taken in conjunction with the accompanying drawings of which:

DETAILED DESCRIPTION OF THE INVENTION

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner understood by those possessing ordinary skill in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Turning to the drawings, wherein like reference numerals refer to like elements, the invention is illustrated as being implemented in a suitable computing environment.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
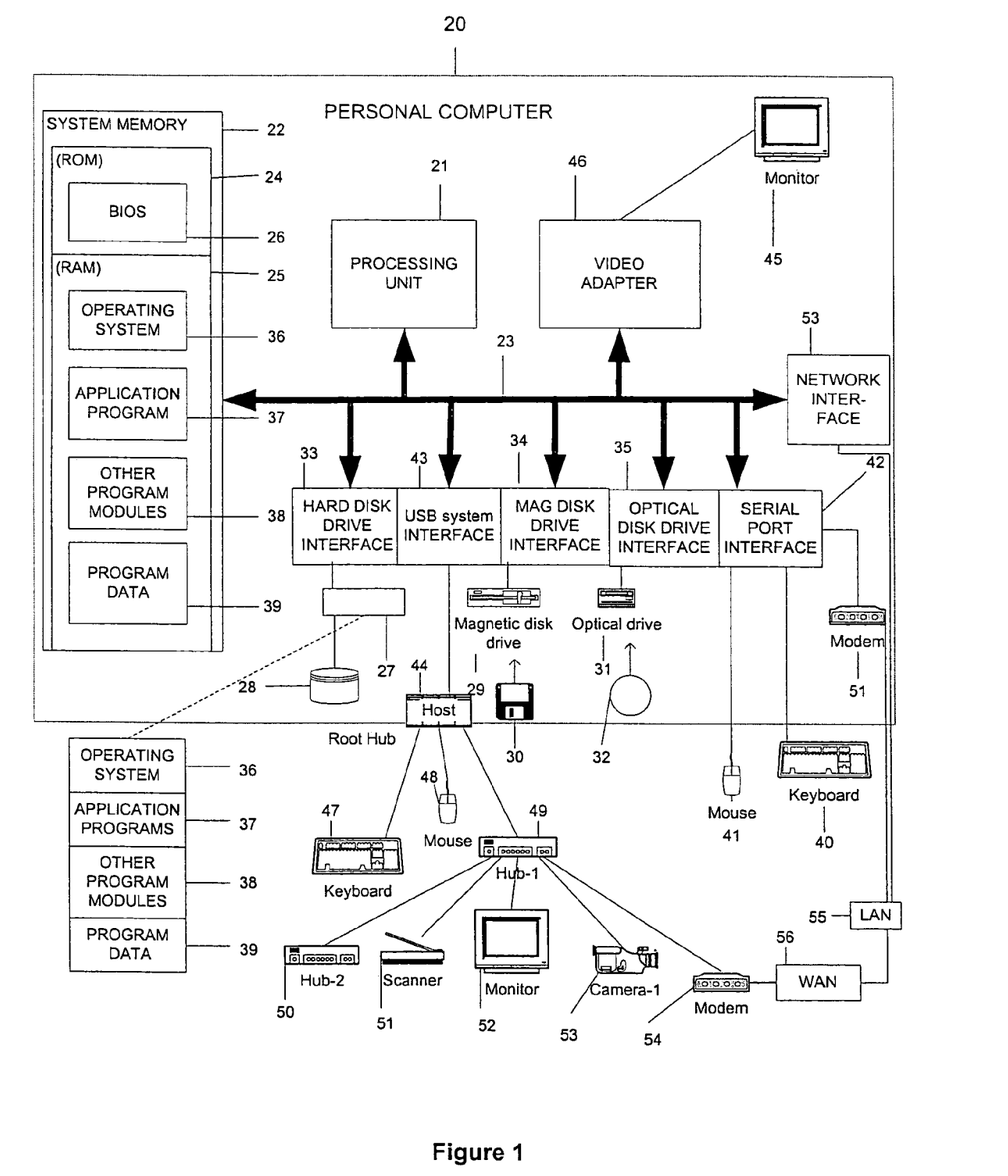
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 may further include a hard disk drive 27 for reading from and writing to a hard disk 28, a magnetic disk drive 29 for reading from or writing to a removable magnetic disk 30, and an optical disk drive 31 for reading from or writing to a removable optical disk 32 such as a CD ROM or other optical media.

The hard disk drive 27, magnetic disk drive 29, and optical disk drive 31 are connected to the system bus 23 by a hard disk drive interface 33, a magnetic disk drive interface 34, and an optical disk drive interface 35, respectively. The drives and their associated computer-readable media provide nonvolatile storage of computer readable instructions, data structures, program modules and other data for the personal computer 20. Although the exemplary environment described herein employs a hard disk 28, a removable magnetic disk 30, and a removable optical disk 32, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 28, magnetic disk 30, optical disk 32, ROM 24 or RAM 25, including an OS 36, one or more applications programs 37, other program modules 38, and program data 39. A user may enter commands and information into the personal computer 20 through input devices such as a keyboard 40 and a pointing device 41. Other input devices (not shown) may include a microphone, joystick, game pad, satellite dish, scanner, or the like. These and other input devices are often connected to the processing unit 21 through a serial port interface 42 that is coupled to the system bus. Increasingly, such devices are being connected by the next generation of interfaces, such as a universal serial bus (USB) 43 with a root hub/Host 44, and to which other hubs and devices may be connected. Other interfaces that may be used include parallel ports, game ports, and the IEEE 1394 specification available at http://www.standards.ieee.org/catalog/bus.html#1394-1995. A monitor 45 or other type of display device is also connected to the system bus 23 via an interface, such as a video adapter 46. In addition to the monitor, personal computers typically include other peripheral output devices.

The USB connections illustrate its utility. A keyboard 47, a pointing device 48 and another hub, hub-1 49, are connected to the root hub/Host 44. Hub-1 49 is further connected to another hub, hub-2, 50, scanner 51, monitor 52, camera-1 53, and modem 54. It should be understood that additional cameras and devices may be directly connected to the computer instead of a USB. Thus, the system depicted is capable of communicating with a network and sending/receiving audio, video and data.

The personal computer 20 may operate in a networked environment using logical connections to one or more remote computers. The types of connections between networked devices include dial up modems, e.g. modem 51 may be directly used to connect to another modem, ISDN, xDSL, cable modems, wireless and include connections spanning users connected to the Internet. The remote computer may be another personal computer, a server, a router, a network PC, a peer device or other common network node, and typically includes many or all of the elements described above relative to the personal computer 20 in FIG. 1. The logical connections depicted in FIG. 1 include a local area network LAN 55 and a wide area network WAN 56. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. In particular, distributed computing based on dynamic networks that can reconfigure themselves with a device providing functionality, such as a video display, to another device is intended to be included.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Table 1 presents a sampling of graphical elements or windows used as UI elements in addition to the familiar window interface. This list is not intended to be exhaustive, and instead, is only illustrative of the some of the behaviors made possible by different graphical UI elements. Different OSs and applications include additional icons, bitmaps and graphical shapes that also function as UI elements. Often the UI elements facilitate in the generation of events that are subsequently handled by the application or the OS or even plug-in routines. It is to be noted that additional graphical controls, including those with audio and video properties are being developed and being continually released. Thus, "graphical controls" and other similar terms should be understood to include audio/video capable elements.

Figure 2:
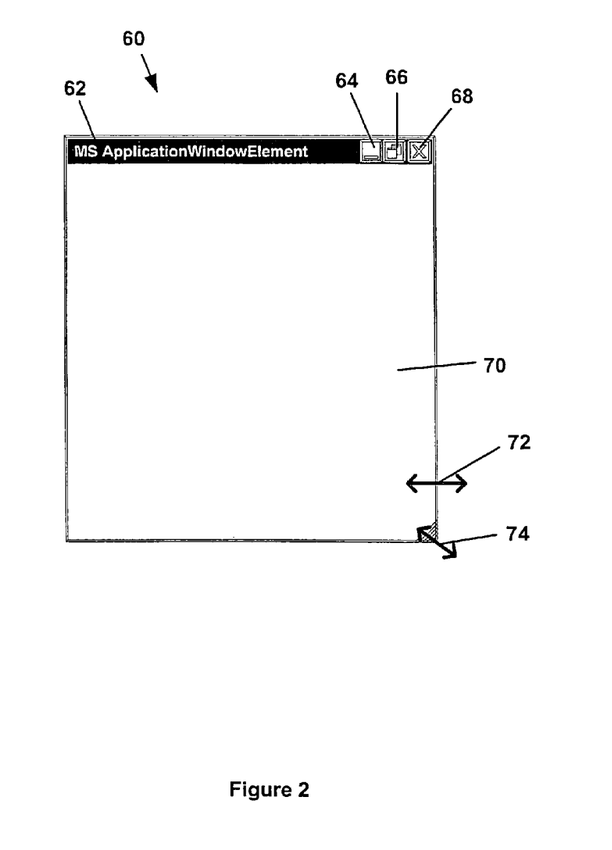
FIG. 2 is a schematic providing an overview of a typical window element used to graphically represent an application's real estate in a possible embodiment.

FIG. 2 is an illustration of a customary window element 60, also termed a "top-level window," used to represent the UI for an application. The window element 60 has a title and logo 62 in the system area along with system buttons for minimization 64, restore 66 and close 68 functions. The window element encloses a client area 70 that is available for placing text and/or graphics. It should be noted that the content of the title and logo 62 is also controllable by the application. Furthermore, the window element 60 has borders 72 that can usually be manipulated to change the real estate occupied by the window element 60 on the desktop. Similarly, the corner 74 can be used to change the real estate by changing the base and the side of the window element 60 by dragging it with a pointing device.

Figure 3:
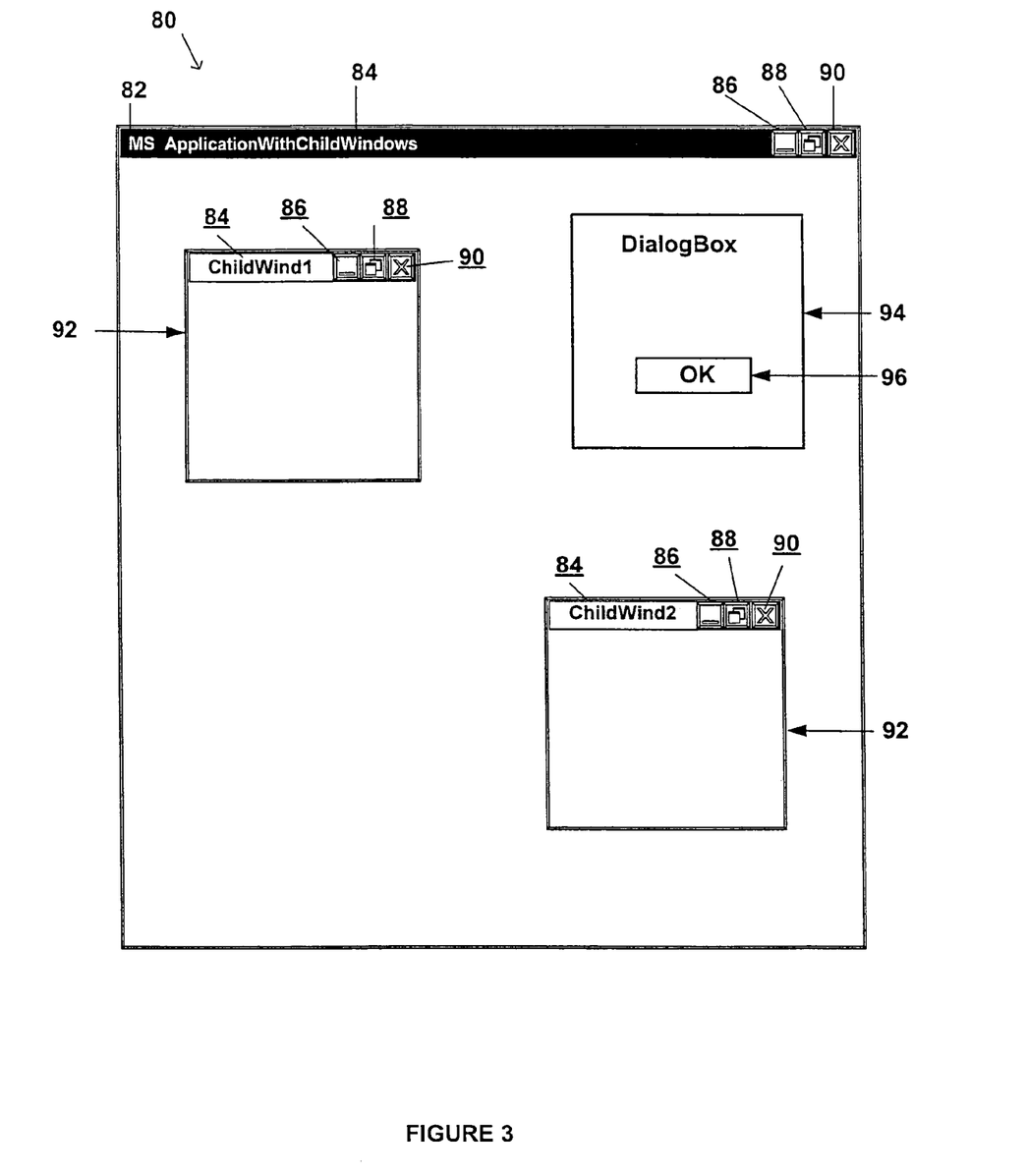
FIG. 3 illustrates an application's main window with several child windows elements within it.

FIG. 3 is an illustration of a top-level window 80 with several child windows contained therein. These child windows may typically be controlled by, i.e., created by, the application thread that created the parent top-level window or be controlled by another thread that acts in concert with the thread controlling the top-level window. The top level window 80 has a left system button 82 for opening a drop down menu to select familiar options such as "move," "close" etc. The top-level window also has a title bar 84 and system buttons. The system buttons are represented by familiar standard shapes illustrated by the "minimize" button 86, "restore" button 88, and the "close" button 90. The child windows contained in the client area of the top-level window 80 include other windows 92 and a dialog box 94 to illustrate the variety of graphical symbols that may be present. Some of the child window elements contain the familiar system buttons.

In order to understand the relationship between the displayed window elements, and the organization of the computing environment, it is useful to understand the thread-based computing environment discussed previously. In graphical user interfaces (GUIs) there are many different tasks that generate information to be displayed to the user.

TABLE 1

| Description | Options | Notifications |
|---|---|---|
| Status bar: displays information defined by an application. | Simple-mode - one section; and Multi-mode - displaying more than one type of information in their respective sections. | May generate events corresponding to mouseovers or mouse clicks over a particular section. |
| Button: a bitmap displaying selected text. | Can associate text or selected bitmaps to modify its appearance. | May generate events corresponding to mouseovers or mouse clicks over a particular section. |
| Message box: displays a text message. | Can associate selected text. | May generate events corresponding to mouseovers or mouse clicks over a particular section. |
| Tool bar: displays a collection of buttons in a bar. | Can associate selected text or pictures. | May generate events corresponding to mouseovers or mouse clicks over a particular section. |
| Tool tip: displays text explaining the tool function. | Can associate selected text. | May generate events corresponding to mouseovers over a particular button or another graphic. |
| Trackbar: displays a scrolling control with a slider and a set of notches. | Can associate text and numbers with the scale. | May generate events corresponding to mouse-dragging events. |
| Spin box: displays arrows in an updown control. | Can specify location and size. | May generate events corresponding to mouse-clicks over a particular section. |

Similarly there is a constant stream of inputs from a variety of sources such as the keyboard, the pointing devices and the like. All of these need to be organized in order to allow programs to receive input and send output in a consistent manner without losing or misinterpreting data.

Figure 4:
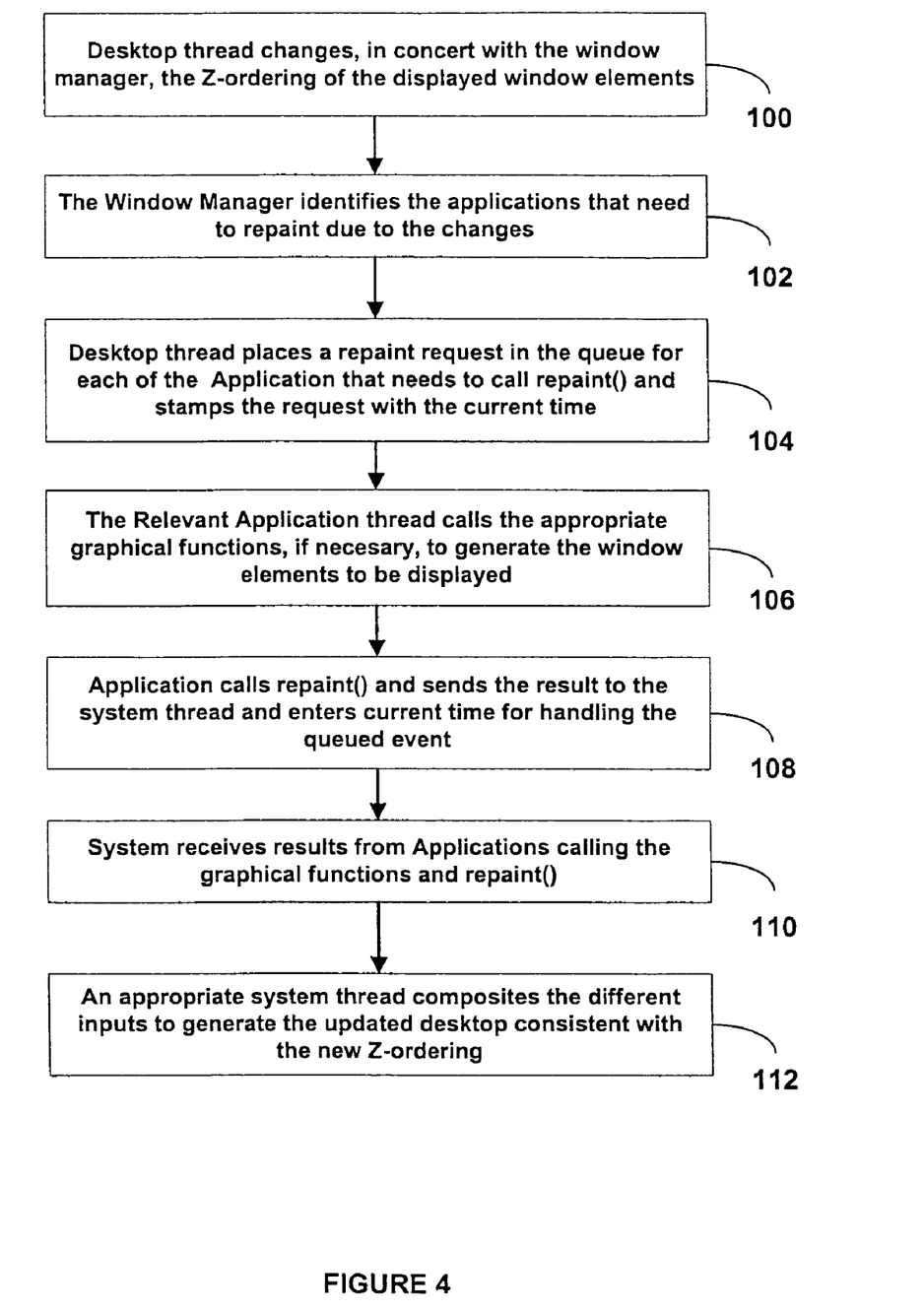
FIG. 4 illustrates a possible implementation for managing the display of graphic UI elements in a computing system.

FIG. 4 illustrates an embodiment of a system for managing a display, which is usually a desktop, with a plurality of window elements corresponding to applications and system components. Advantageously, a desktop thread is used to manage the desktop. The window elements on a desktop are managed by the window manager, which arranges them in a tree structure termed Z-ordering. The window in the foreground is the root of the tree and the remaining windows are occluded or covered to different extents by other windows depending on their position in the tree. The foreground window is also the window in focus. The selection of another window to be in focus results in manipulation of the Z-order to reflect the change and an updating of the desktop.

In one of the embodiments schematically described in FIG. 4, if the user shifts the focus to another window, the system adjusts the Z-order tree accordingly and generates a signal to the relevant applications to request a repaint( ) operation so that the changes to the desktop can be implemented. Such requests can advantageously placed in the virtual queue for a given application. This arrangement results in the applications tracking the details of the graphical output.

Step 100 in FIG. 4 shows a change in the Z-ordering made by one of the system threads in concert with the window manager, which tracks the different windows. The window manager identifies the windows affected by the change (step 102) along with the threads or applications that own the windows. In order to update the desktop, a request to repaint( ) is made to the owners of the various window elements (step 104). This request is preferably tagged with the time at which the request is made. The repaint request is handled by providing the necessary graphical information by calling relevant APIs (step 106). The application or thread then calls repaint( ) and thus supplies the result to the system by calling graphics APIs (step 110) while noting the time at which the request to repaint was handled (step 108). These time stamps allow an estimate to be made of the promptness with which the application handles the requests queued in its message or event queue for handling. Finally, particularly in systems using "α" in addition to the customary colors, an appropriate system thread composites the final image (step 112). It should be noted that the last step need not be found in many implementations, and instead the application may supply the repainted input with no need to composite it with other images.

In some implementations, layered windows are implemented so that the repainting operation may include compositing. In a nutshell, the layered window feature is implemented by maintaining an image of the an area of the screen occupied by the layered window that contains all the bits not belonging to the layered window. When either a layered window repaints or there are drawing operations in the specified area of the screen, the recompositing operation occurs in the context of the of the thread causing the changes. In any event, the precise details for implementing compositing to allow use of one or more transparency parameters, such as α, in course of repainting are implementation details particular to some of the many embodiments enabled by the invention described here. Such details are intended to be within the scope of the claimed invention.

Figure 5:
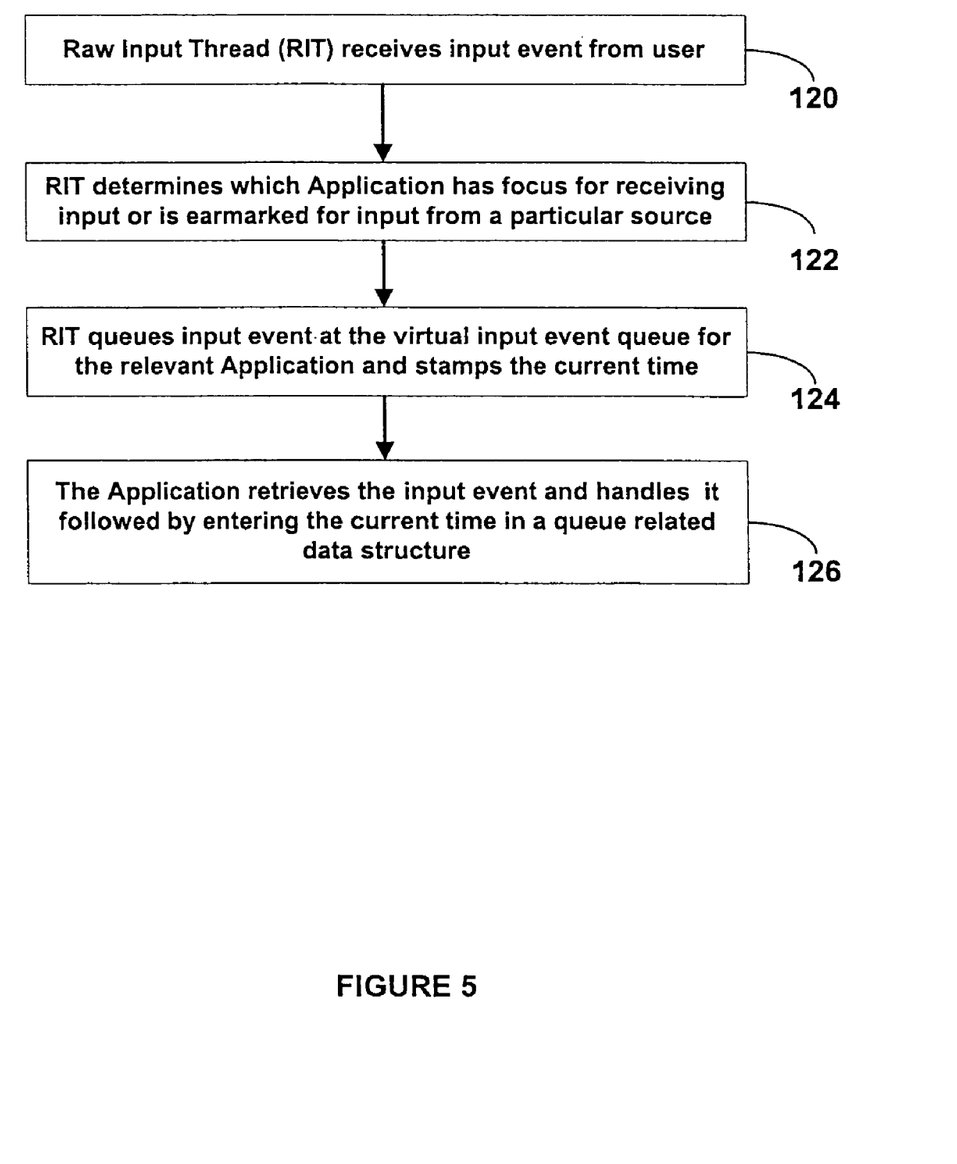
FIG. 5 illustrates a possible implementation for managing the input in a computing system.

The input to the computing system is handled by the RIT, as is illustrated in FIG. 5. RIT receives (step 120) and determines which application, if any, is the intended target for the input (step 122). It accordingly forwards the input to the relevant applications (step 124) by placing it in their respective virtual input queue. A helpful rule is to send the input to the application in focus for receiving input. This arrangement dissociates the processing of the input from the actual receipt of the input by implementing a virtual input queue at the application and removes the potential for system-wide bottlenecks due to a single task's failure to handle the input. Preferably, in an embodiment, each entry in this queue is marked with a time stamp indicating the time when it was placed in the virtual input queue for a particular application by RIT. The queue also has a time stamp to indicate when a queued entry was last handled by the application (step 126).

Suppose that an application has stopped processing messages in its input queue while waiting for a network call or some computationally expensive operation to complete. This scenario may make the system appear to be hung since all of the input is sent to the application's virtual input queue and elicits no response from the busy application while the foreground window makes a shift in the focus difficult by obscuring other windows behind it.

Furthermore, even if another window is selected to be in the foreground, it is difficult to regenerate the desktop if an application window occupying a significant of the desktop real estate is non-responsive to requests to repaint( ). This may result in an imperfectly painted desktop that looks strange and appears to be, at least partially, non-responsive.

Figure 6:
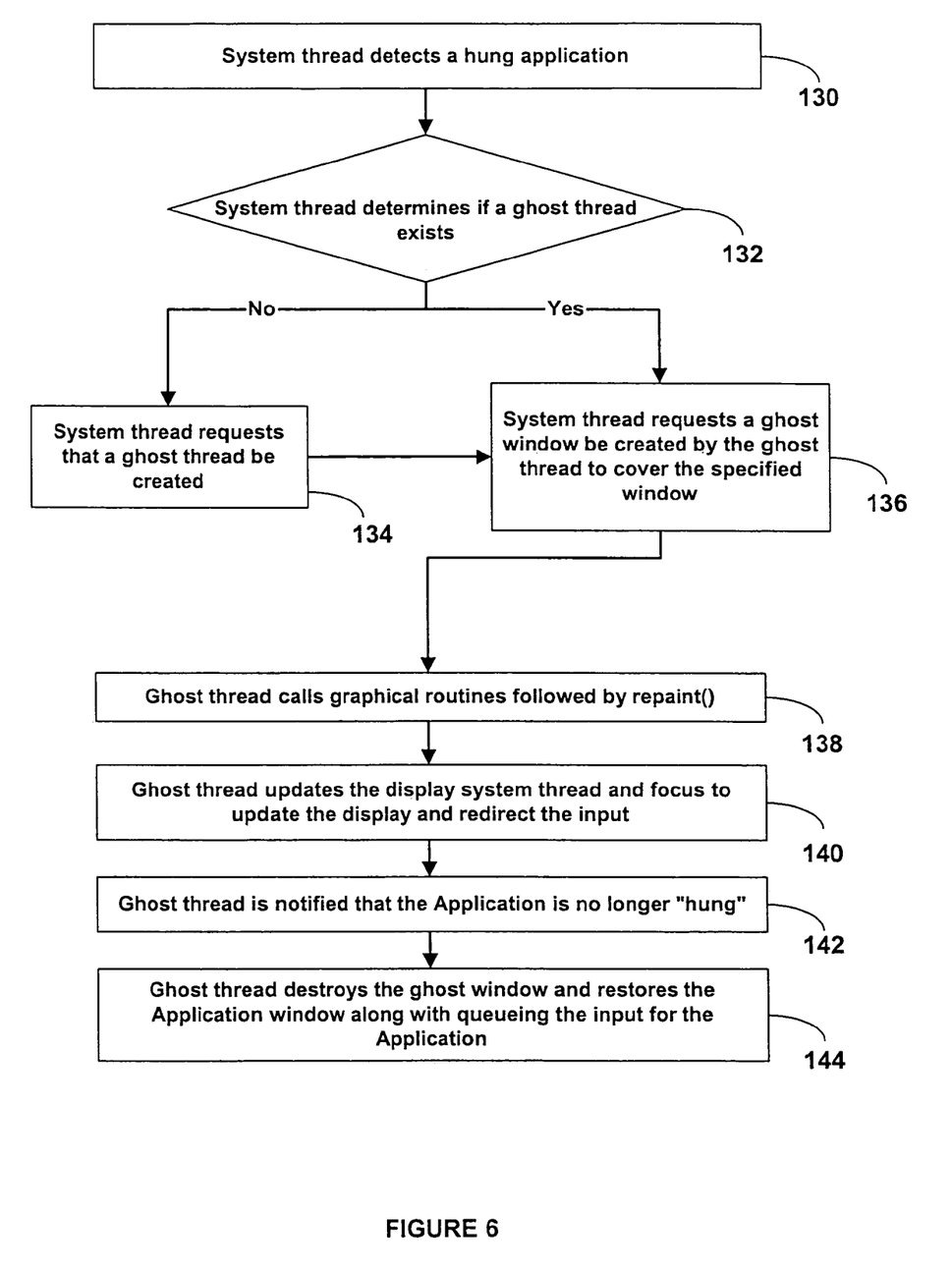
FIG. 6 illustrates high level view of the steps in creating and managing a ghost window.

In light of these considerations, FIG. 6 illustrates a high level illustration of a possible embodiment in accordance with the invention for making the system appear more responsive, and in particular making the user interface responsive enough to generate a desktop that is not frozen. This task is advantageously accomplished using a three-step procedure. The first step is detection of a hung application (step 130). There are many methods that are suitable for determining if an application is hung. While the user notices a non-responsive system, the inability of an application to handle input queued in its virtual input queue is often the real reason behind the non-responsive user interface. A system thread, e.g., a desktop thread or RIT, can detect a hung application by noting if the queued entries are being handled within a set threshold period of time.

Alternatively, different types of entries can have their own thresholds or the number of entries in the queue and other factors like the application or thread priority could also be considered in deciding if an application was actually hung. Different methods of determining whether an application is hung, including the user having the option of inputting a suitable signal, are intended to be included in step 130.

If an application is hung then the system thread determines if a ghost thread exists (step 132). The desktop thread, for instance, may make such a determination if a request to repaint is queued for too long. Similarly, the RIT or even another thread may be charged to make such a determination. If there is no ghost thread, then a ghost thread is created (step 134). It should be noted that although in this embodiment a ghost thread is used to control the creation and destruction of all ghost windows, this is not intended to be a limitation. The task of managing ghost windows could be handled by another thread or more than one thread in different embodiments in accordance with the invention. If a ghost thread exists then it is asked to create a ghost window (step 136) using the location and properties of the frozen window belonging to the hung application. These properties are advantageously obtained from the system threads managing the display.

The ghost window preferably covers the frozen window belonging to the hung application while the hung window itself is hidden from the end-user's view. Now, the desktop thread does not need to use the input from the hung application to update the display and instead uses the ghost window by directing a repaint request to the ghost thread instead. The ghost thread calls the APIs to create the ghost window and then calls repaint( ) (step 138). This permits a complete update of the display (step 140) and handling of the input that otherwise would have to be handled by the now hung application. Similarly, mouse movements and mouse-clicks corresponding to the area occupied by the frozen window are handled by the ghost thread. In part, the system buttons come back to life at least as far as the user is concerned. The ghost window, corresponding to the previously frozen window, can be minimized, maximized, resized, moved and even closed. Each of these actions has different consequences to complete the simulation of the application window element. The close system button preferably terminates, i.e., results in the hung application exiting although other actions are possible. Additional or fewer functions may be implemented in the ghost UI. In effect, the ghost UI is a place saver for the application's UI.

In an embodiment in accordance with the invention, the events and messages for the ghost window are preferably divided into two sets depending on whether they should be handled by the ghost thread in lieu of the application or cached for later handling by the application. This is advantageously implemented by treating input with the ghost window in focus as being intended for the application except for some input events that may be handled by the ghost thread. The remaining input events are cached for subsequent forwarding to the hung application. Furthermore, inputs such as moving the ghost window are also forwarded to the application to restore the application window in the position occupied by the ghost window if and when the application ceases to be non-responsive.

A system thread detects if the hung application starts handling its queued entries (step 142). Advantageously the renewed responsiveness of an application may be detected without requiring extensive monitoring by placing a high priority special entry in the queue for the application. Thus, when the hung application completes its task and is able to handle queue entries, it first responds to the high priority entries. The high priority special entry merely requires it to send a message, directly or indirectly, to a thread, e.g., the ghost thread in order to initiate replacement of the place saver ghost window by the real application window. The ghost thread detects that the application is no longer non-responsive, i.e., hung, (step 142) and destroys the ghost window, initiates restoration of the application window by placing appropriate requests to repaint and forwarding cached input to the application queue (step 144).

Figure 7:
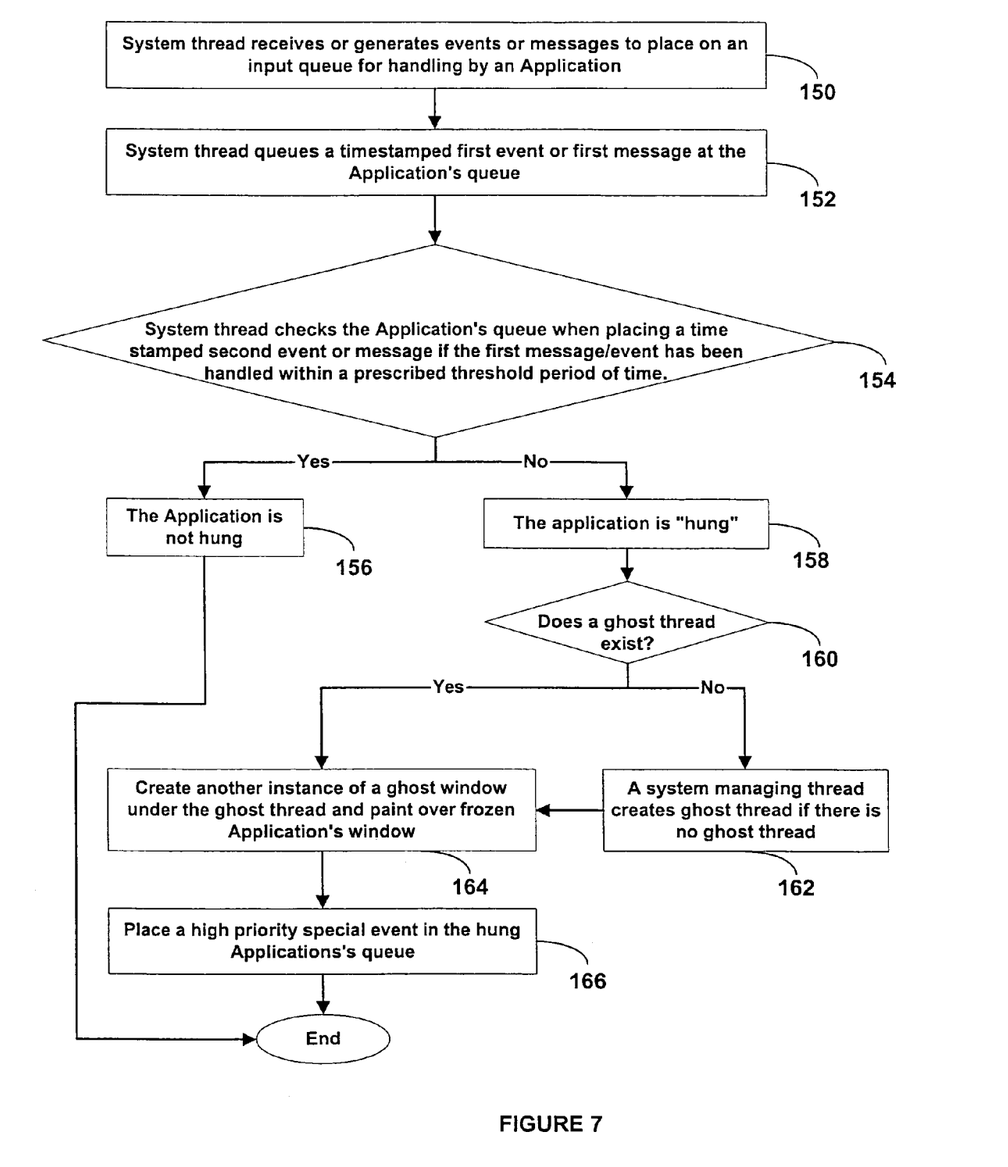
FIG. 7 illustrates a possible implementation for creating a ghost window.

FIG. 7 illustrates an implementation of generating the ghost window. A system thread receives or generates events/messages for handling by an application (step 150).

The system thread time stamps the event/message with the time at which it is placed in the queue for the application (step 152). The system thread checks the timestamp for the queue to determine the time when the last queue entry was handled by the application. If the application has not handled queue entries for greater than a threshold time (step 154) then it is treated as being hung (step 156). Else, the application is continues (step 158).

If the application is hung then it is determined whether a ghost thread exists (step 160). If there is no ghost thread then one is created by a system management thread (step 162). Else, the ghost thread is requested to generate another instance of a window to replace the window corresponding to the hung application (step 164) followed by placing a high priority special entry in the application's queue (step 166). In this scheme the system thread could be the desktop thread, RIT or another thread. Furthermore, the system managing thread could be the desktop thread as well in some embodiments.

Figure 8:
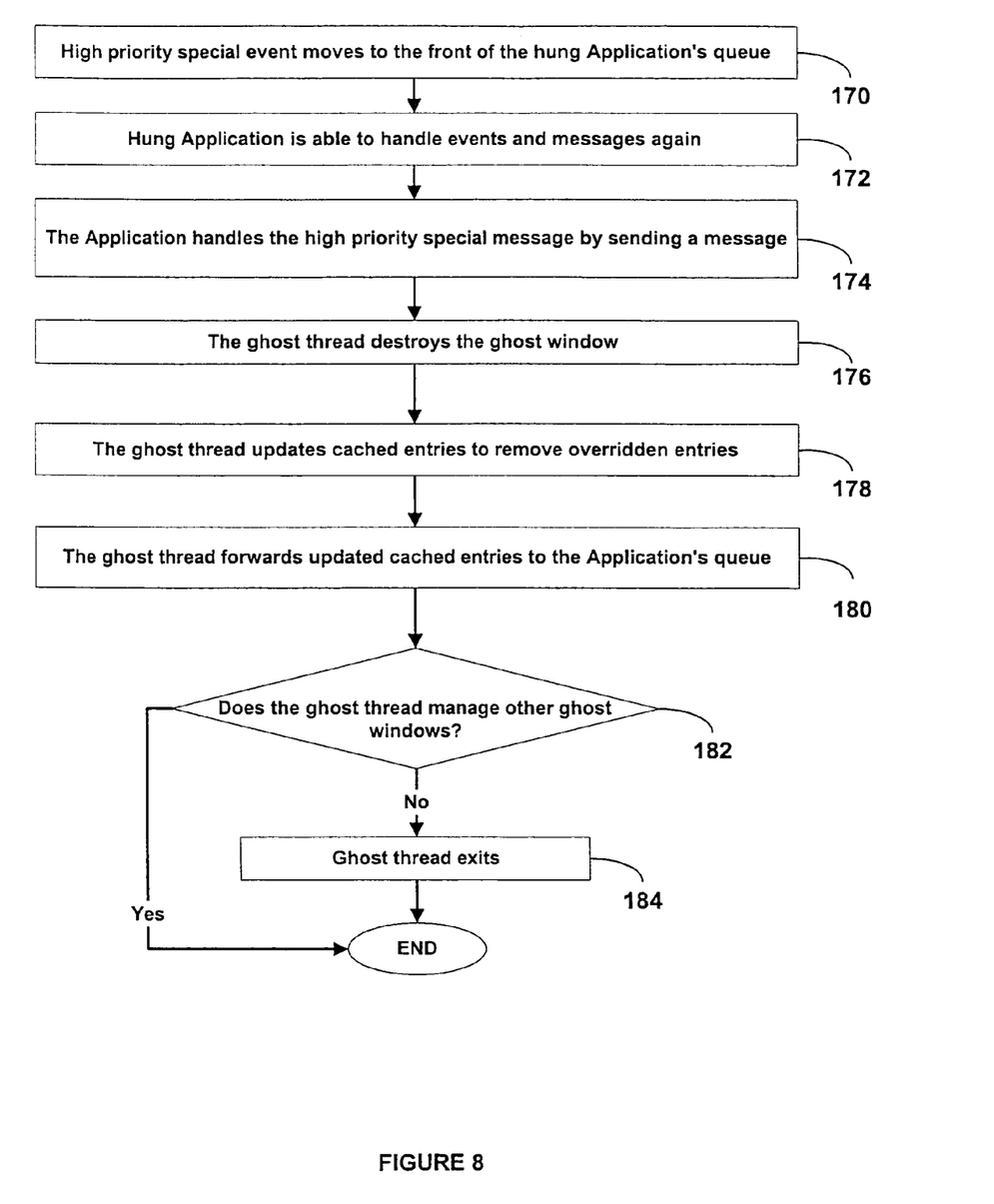
FIG. 8 illustrates a possible implementation for destroying a ghost window.

FIG. 8 further illustrates an implementation in accordance with the invention for restoring a newly responsive application's window. At step 170, a high priority special entry is placed, and naturally moved ahead of other entries in a hung application's queue. When the hung application gets over the bottleneck that made it non-responsive, it starts handling entries in its queue at step 172. It first handles the high priority special entry, and consequently sends a message, directly or indirectly, to a ghost thread. The ghost thread destroys the ghost window corresponding to the now responsive application (step 176) along with updating cached entries for the application to remove redundant entries (step 178). Such redundant entries may include intermediate move commands executed on the ghost window and now are replaced by the last location of the ghost window as the place to restore the application window. A suitable last state may even be as a minimized window element. The updated cached entries are added to the queue for the application (step 180). This has the effect of enhancing continuity between the ghost window and the application window. The user is only aware of the application window changing while the application was busy due to the absence of detailed application specific information in the client area of the frozen application window. In some embodiments the ghost window may even identify itself as a ghost window with limited functionality. But the application does not become non-responsive as far as the user is concerned because it can apparently be minimized out of the way or even closed to smoothly terminate it.

Since there is no reason to keep the ghost thread if there are no ghost windows, at least in many embodiments, a check is made to determine if there are any more ghost windows remaining (step 182). If there are no more ghost windows then the ghost thread exits, else it continues to manage its other ghost windows.

Figure 9:
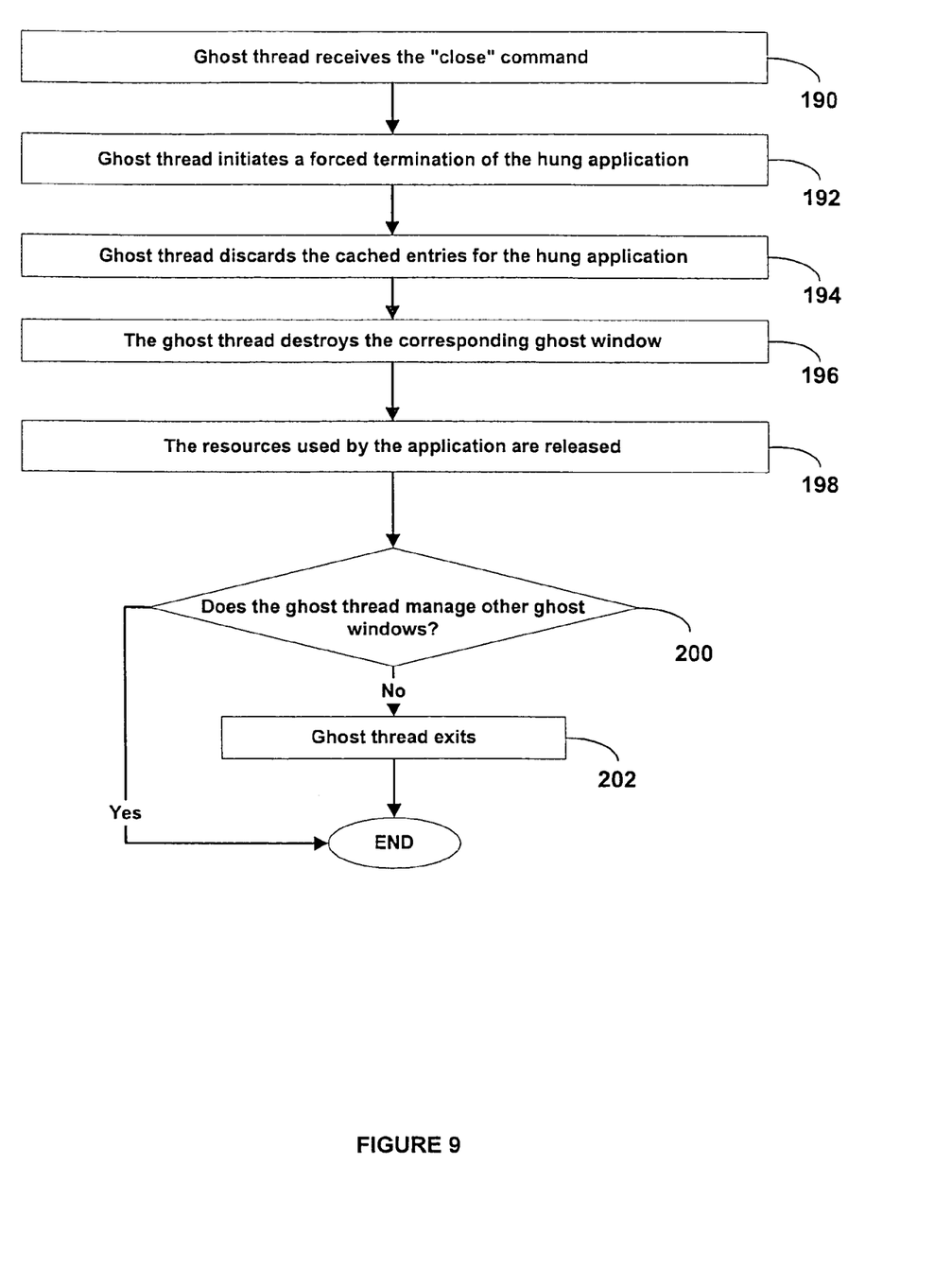
FIG. 9 illustrates the operation of the close command in an embodiment of the invention.

FIG. 9 illustrates the operation of the close command in an embodiment of the invention. The ghost window receives a close command at step 190. The ghost thread responsively initiates a forced closure of the hung application at step 192. Such a forced termination may be carried out, for instance, by invoking the taskman.exe in the "WINDOWS®" OS environment manufactured by the "MICROSOFT®" Corporation of Redmond, Wash. Since there is no need for forwarding entries to the hung application, the cached entries are discarded (step 194) and the ghost window is destroyed (step 198). If there are no other ghost windows being managed by this ghost thread (step 200) then the ghost thread exits (step 202).

Figure 10:
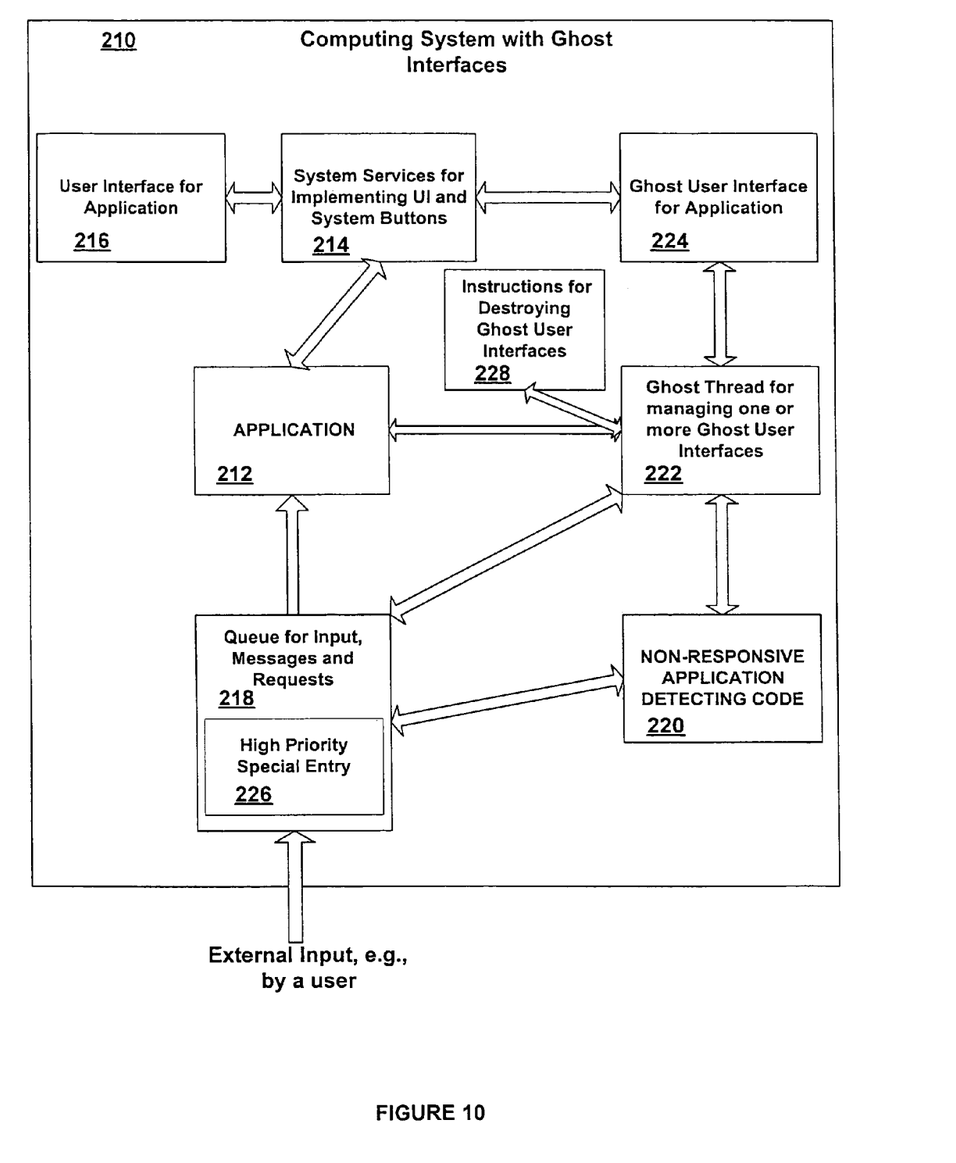
FIG. 10 illustrates a possible system in accordance with the invention.

FIG. 10 illustrates a possible system in accordance with the invention. In a computing system with ghost interfaces 210 an application 212 utilizes System Services 214 for providing a user interface 216. The system services may include a desktop thread and the graphical APIs used to generate a user interface. Application 212 has at least one queue 218 for receiving input from users and other programs, messages as part of a client-server architecture and the like. The queue 218 has two way communications with code 220 for detecting if application 212 is hung. Code 220 may be part of a system thread, e.g., the desktop thread or RIT or be a separate component. Code 220 triggers the ghost thread 222 resulting in creation of a ghost user interface 224 which can communicate with the System Services 214 for acquiring data to replace the Application's user interface 216. System Services 214 also redirects input and focus along with providing functionality for executing system buttons such as move and close commands in lieu of the Application. Ghost thread 222 or code 220 can place a high priority special entry 226 in the queue 218. Handling of this entry by a hung application indicates that the application is responsive and results a message being sent to the ghost thread 222 and the instructions 228 for destroying the ghost user interface, which, in turn initiate the destruction of the ghost user interface 224 by the ghost thread. Instructions 228 can advantageously be part of the ghost thread in some embodiments. It should be understood that not all possible system components are described in FIG. 10 in the interest of clarity.

It should be noted that the procedure described is quite general and can be advantageously implemented in contexts that do not require an application to become non-responsive. Thus, a first window element, controlled by a scheduled code segment, e.g., a thread, providing replacement window elements, may be invoked to replace a second window element in response to a flip-window signal. Another flop-window signal can result in replacing the first window with the second window. Events associated with the windows can be handled analogously to that described herein for hung applications. In the case of embodiments replacing hung windows, the flip-windows signal corresponds to detection of a hung application or thread and the flop-window signal, then, corresponds to detection of the hung application or the hung-thread becoming responsive again. Furthermore, in a networked computing environment it may be possible to use applications or code executing on different processors or even machines to provide the independently scheduled functionality of threads to provide ghost or replacement user interface elements for a variety of applications. Thus, a scheduled code segment is a more general concept than the more familiar thread.

While much of the description of embodiments in accordance with the invention are in the "WINDOWS®" OS environment, this description is not intended to exclude other OSs such as the "MACINTOSH®," "SOLARIS®" and other UNIX based platforms along with distributed computing.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for managing an original user interface of an application, the method comprising:
  generating, via a system thread, a plurality of events for handling by the application;
  generating a timestamp, via the system thread, comprising a time when each of the plurality of events are entered in an event queue of the application;
  checking, via the system thread, the event queue to determine the time when a last event in the plurality of events entered in the event queue, was handled by the application;
  signaling a hung state for the application when the application has not handled any of the plurality of events in the event queue for greater than a threshold time, wherein different types of events in the plurality of events entered in the event queue have their own threshold times;
  creating a ghost user interface in response to the hung state that appears in place of the original user interface, wherein creating the ghost user interface includes creating a ghost thread, which, in turn, creates the ghost user interface, wherein the ghost thread handles at least one event corresponding to a close operation in an area covered by the ghost user interface, the close operation comprising a forced termination of the application having the hung state, wherein the application is terminated by automatically invoking a computer operating system application program, wherein the plurality of events are divided into two sets of events, wherein a first set of events is handled by the ghost thread in lieu of the application, and wherein a second set of events is cached for later handling by the application after the application is no longer in the hung state, wherein the second set of events comprises input events with the ghost user interface in focus, wherein the ghost user interface is in focus when the ghost user interface is in the foreground;
  placing a high priority special event in an event queue of the application; and
  replacing the ghost user interface with the original user interface as a result of the high priority special event being handled by the application, wherein the high priority special event is handled ahead of other entries in the event queue, wherein the other entries in the event queue comprise a last location of the ghost user interface corresponding to a present location of the ghost user interface and which replaces, in the event queue, at least one intermediate move command previously executed on the ghost user interface, and wherein the last location of the ghost user interface is utilized as a location to restore the original user interface of the application.

2. The method of claim 1, wherein the event queue is a user interface event queue.

3. The method of claim 1, wherein, in addition, the event queue of the application contains user interface events.

4. The method of claim 1, wherein the high priority special event is a user interface event.

5. The method of claim 1, wherein the high priority special event is a special purpose activity-detect event.

6. The method of claim 1 wherein the step of creating the ghost thread includes determining if a ghost thread exists and creating a ghost thread if the ghost thread does not exist.

7. The method of claim 1 wherein the step of creating the ghost user interface includes creating the ghost user interface in an area occupied by the original user interface element.

8. The method of claim 7, the method further having the step of directing input events corresponding to the area covered by the ghost user interface, which includes at least some of the area covered by the original user interface element, to a ghost thread.

9. The method of claim 8, the method further having the step of having the ghost thread handle at least one event corresponding to a minimization operation in the area covered by the ghost user interface.

10. The method of claim 8, the method further having the step of having the ghost thread handle at least one event corresponding to a resizing operation in the area covered by the ghost user interface.

11. The method of claim 8, the method further having the step of having the ghost thread handle at least one event corresponding to a move operation in the area covered by the ghost user interface.

12. The method of claim 8, the method further having the step of having the ghost thread cache at least one event corresponding to a keyboard input corresponding to the ghost user interface.

13. The method of claim 8, the method further having the step of having the ghost thread handle at least one event corresponding to a keyboard input corresponding to the ghost user interface.

14. A multithreaded computing system for executing an application having a user interface, wherein if the application is non-responsive, the user interface is replaced by a ghost user interface, the system comprising:
 a processor;
 a memory coupled to said processor;
 the memory having stored thereon:
 a plurality of computer executable instructions for generating, via a system thread, a plurality of events for handling by the application, generating a timestamp, via the system thread, comprising a time when each of the plurality of events are entered in an event queue of the application, and checking, via the system thread, the event queue to determine the time when a last event in the plurality of events entered in the event queue, was handled by the application;
 non-responsive-application detecting code for detecting a non-responsive application, wherein the non-responsive application is detected when the application has not handled any of the plurality of events in the event queue for greater than a threshold time, wherein different types of events in the plurality of events entered in the event queue have their own threshold times;
 a ghost thread for creating the ghost user interface to replace the user interface in response to detection of a non-responsive application, wherein creating the ghost user interface includes creating a ghost thread, which, in turn, creates the ghost user interface, wherein the ghost thread handles at least one event corresponding to a close operation in an area covered by the ghost user interface, the close operation comprising a forced termination of the non-responsive application, wherein the non-responsive application is terminated by automatically invoking a computer operating system application program, wherein the plurality of events are divided into two sets of events, wherein a first set of events is handled by the ghost thread in lieu of the application, and wherein a second set of events is cached for later handling by the application after the application is responsive, wherein the second set of events comprises input events with the ghost user interface in focus, wherein the ghost user interface is in focus when the ghost user interface is in the foreground;

a high priority special entry in a message queue of the application for detecting if the application is responsive, wherein the high priority special entry is handled ahead of other entries in the message queue, wherein the other entries in the message queue comprise a last location of the ghost user interface corresponding to a present location of the ghost user interface and which replaces, in the message queue, at least one intermediate move command previously executed on the ghost user interface, and wherein the last location of the ghost user interface is utilized as a location to restore the user interface of the application; and
 a plurality of computer executable instructions for destroying the ghost user interface in response to handling of the high priority special entry by the application.

15. The system of claim 14 further comprising a cache of events and messages for handling by the application wherein the events and messages are directed at the ghost thread.

16. The system of claim 14 further comprising a second non-responsive application with a second user interface and a second ghost user interface created by the ghost thread.

17. The system of claim 14 further comprising responsive-application detecting code for detecting when a non-responsive application becomes responsive.

18. The system of claim 17 further comprising responsive-application user interface restoring code for replacing the ghost user interface with the user interface in response to detecting that the first application has become responsive.

19. A computer-readable storage medium having computer executable instructions which, when executed by a computer, will cause the computer to perform a method for managing an original user interface of an application, comprising:
 generating, via a system thread, a plurality of events for handling by the application;
 generating a timestamp, via the system thread, comprising a time when each of the plurality of events are entered in an event queue of the application;
 checking, via the system thread, the event queue to determine the time when a last event in the plurality of events entered in the event queue, was handled by the application;
 signaling a hung state for the application when the application has not handled any of the plurality of events in the event queue for greater than a threshold time, wherein different types of events in the plurality of events entered in the event queue have their own threshold times;
 creating a ghost user interface in response to the hung state that appears in place of the original user interface, wherein creating the ghost user interface includes creating a ghost thread, which, in turn, creates the ghost user interface, wherein the ghost thread handles at least one event corresponding to a close operation in an area covered by the ghost user interface, the close operation comprising a forced termination of the application having the hung state, wherein the application is terminated by automatically invoking a computer operating system application program, wherein the plurality of events are divided into two sets of events, wherein a first set of events is handled by the ghost thread in lieu of the application, and wherein a second set of events is cached for later handling by the application after the application is no longer in the hung state, wherein the second set of events comprises input events with the ghost user interface in focus, wherein the ghost user interface is in focus when the ghost user interface is in the foreground;

placing a high priority special event in an event queue of the application, wherein the high priority special event is handled ahead of other entries in the event queue and wherein the handling of the high priority special event triggers replacing the ghost user interface with the original user interface resulting in the destruction of the ghost interface when the application becomes responsive from the hung state, wherein the other entries in the event queue comprise a last location of the ghost user interface corresponding to a present location of the ghost user interface and which replaces, in the event queue, at least one intermediate move command previously executed on the ghost user interface, and wherein the last location of the ghost user interface is utilized as a location to replace the ghost user interface with the original user interface of the application.

\* \* \* \* \*